United States Patent
Kuan et al.

(10) Patent No.: US 6,754,730 B2
(45) Date of Patent: Jun. 22, 2004

(54) INTELLIGENT APPARATUS FOR SHARING A USER I/O INTERFACE AMONG ALL INTELLIGENT MODULES THEREOF

(75) Inventors: Ping-Sung Kuan, Hsinchu (TW); Wei-Hung Tsai, Hsinchu (TW)

(73) Assignee: D-Link Corporation, Hsinchu (TW)

( * ) Notice: Subject to any disclaimer, the term of this patent is extended or adjusted under 35 U.S.C. 154(b) by 240 days.

(21) Appl. No.: 10/121,587

(22) Filed: Apr. 15, 2002

(65) Prior Publication Data

US 2003/0196017 A1 Oct. 16, 2003

(51) Int. Cl.$^7$ .......................... G06F 3/00; G06F 13/00; G06F 15/173; G06F 15/177; H04L 12/28
(52) U.S. Cl. ................ 710/15; 710/8; 710/18; 710/36; 710/37; 710/38; 710/62; 710/64; 710/72; 710/104; 710/305; 710/316; 709/208; 709/220; 709/221; 709/223; 709/224; 709/225; 709/229; 370/241; 370/244; 370/250; 370/251; 379/15.01; 379/333
(58) Field of Search ........................... 710/1, 8, 10, 15, 710/18, 36–38, 62–64, 72, 74, 104, 305, 316, 317; 702/57–59, 183–185, 188; 709/208, 220, 221–225, 229; 370/241, 244, 250, 251, 351–360, 362, 364, 367, 369, 370, 380, 381, 386–388, 422, 427

(56) References Cited

U.S. PATENT DOCUMENTS

| | | | |
|---|---|---|---|
| 5,210,740 A | * 5/1993 | Anzai et al. | ................ 370/228 |
| 5,923,673 A | * 7/1999 | Henrikson | .................. 714/712 |
| 6,434,612 B1 | * 8/2002 | Hughes et al. | ............. 709/223 |

FOREIGN PATENT DOCUMENTS

| | | | | |
|---|---|---|---|---|
| JP | 11-205321 | * | 7/1999 | ........... H04L/12/28 |
| JP | P2000-59411 A | * | 2/2000 | ......... H04L/12/437 |
| JP | P2001-111581 | * | 4/2001 | ........... H04L/12/40 |

* cited by examiner

*Primary Examiner*—Jeffrey Gaffin
*Assistant Examiner*—Tanh Q. Nguyen
(74) *Attorney, Agent, or Firm*—Bacon & Thomas PLLC

(57) ABSTRACT

An intelligent apparatus comprises a master module and a plurality of slave modules each having a CPU, a control circuit and an associated software, wherein each of the slave modules is in communication with the master module, and the CPU of the master module may control the CPUs of the slave modules respectively to form a single system. When the master module detects that a monitoring device coupled to a single user I/O interface installed in the apparatus is performing network monitoring and management with respect to a certain module, the CPU of the master module may transfer an access right of the user I/O interface to the certain module by closing or opening switches installed in the master modules enabling the certain module to receive the access signal from the user I/O interface by closing a switch thereof.

6 Claims, 8 Drawing Sheets

INTELLIGENT APPARATUS FOR SHARING A USER I/O INTERFACE AMONG ALL INTELLIGENT MODULES THEREOF

FIELD OF THE INVENTION

The present invention relates to network switches, and more particularly to an intelligent apparatus capable of sharing a single user I/O interface among all intelligent modules thereof.

BACKGROUND OF THE INVENTION

Network technology has known a rapid and a spectacular development leading to the development of various network switches. The network switches are widely used today in our daily life and work. Such not only facilitates information communication but also brings a great convenience to both our life and work. Moreover, people demand more from network as the technology evolves. For example, people demand network to provide convenient, fast, integrated and diversified services. Thus, an intelligent network switch is developed.

A standard bone 8 implemented in a conventional intelligent network switch apparatus is shown in FIG. 1. As illustrated, a plurality of independent network switches 81, 82, 83, 84, and 85 are provided on an intelligent network switch stack. Each network switch is enclosed in its respective housing and thus has unique electronics, central processing unit (CPU), and network operating system. Each network switch has an associated user input/output (I/O) interface (e.g., RS-232) 811, 821, 831, 841, or 851. Hence, network management person may couple a network monitoring device to the user I/O interface for performing network monitoring and management, system configuration and debugging, and software updating. In view of the above, it can be readily understood that in the conventional network switch apparatus, the plurality of network switches 81, 82, 83, 84 and 85 stacked on the intelligent network switch apparatus are independent from each other. As such, each network switch is capable of communicating with a coupled network device. In a case that a network management person desires to test the network switches through network devices coupled thereto, the network management person has to couple the network devices to the user I/O interfaces 811, 821, 831, 841 and 851 sequentially prior to performing a required monitoring task.

A newly developed intelligent network switch 9 is shown in FIG. 2. As illustrated, a master 91 and a plurality of slave modules (e.g., 92, 93, 94, and 95) are enclosed in a housing. In other words, a plurality of network switch modules 91, 92, 93, 94, and 95 are disposed within the housing. Each of master and slave modules comprises a circuit board having CPU and electronics provided therein and installed network operating system. All of the above modules are provided on a single stack, thus forming a single network switching system. In the network switching system, ports 922, 932, 942, and 952 of the slave modules are in information communication with port 912 of the master by interconnection. In detail, signals or packets may be communicated between CPUs of the master and slave modules through the ports. Hence, the ports are either general network I/O ports (i.e., In-Bands) or independent channels (i.e., Out-Bands). With such ports, the master 91 may manipulate the slave modules 92, 93, 94, and 95. In addition, other network I/O ports on the slave modules are in information communication with other associated network devices by interconnection.

As stated above, the master module 91 and the plurality of slave modules 92, 93, 94, and 95 are disposed within the intelligent network switch 9. While they are electrically coupled together, the electronics of circuit boards thereof are independent. In a case that designers and manufacturers of the master module 91 and slave modules 92, 93, 94, and 95 desire to allow network management person to perform a test thereon, it is required to couple an associated user I/O interface (e.g., RS-232) 911, 921, 931, 941, or 951 to each of the master and slave modules. Also, the user I/O interfaces are projected from housing of the intelligent network switch 9 so that network management person may couple the network monitoring devices to the user I/O interfaces 911, 921, 931, 941 and 951 sequentially prior to performing a required monitoring task on the master and slave modules 91, 92, 93, 94 and 95.

However, the prior art suffered from several disadvantages. For example, user I/O interfaces are projected from housing of the intelligent network switch. In a case that either a module therein is malfunctioned or network management person desires to perform network monitoring and management, system configuration and debugging, or software updating with respect to a certain module, such user I/O interfaces may cause confusion to the network management person in a visual identification. Moreover, such projected user I/O interfaces inevitably complicates an assembly procedure and increases cost of the intelligent network switch.

Thus, it is desirable to provide an intelligent apparatus capable of sharing a single user I/O interface among all intelligent modules thereof in order to overcome the above drawbacks of prior art.

SUMMARY OF THE INVENTION

It is therefore an object of the present invention to provide an intelligent apparatus comprising a master module including a user input/output (I/O) interface, a first central processing unit (CPU), a first control circuit, and a plurality of switches including first and second switches with the first switch coupled between the first control circuit and the user I/O interface, the second switch coupled to the user I/O interface, and the first CPU coupled to the first switch, the second switch and the first control circuit respectively, so that the first CPU is operative to receive or send packets or signals through the first control circuit, and to open or close the first and the second switches; and a plurality of slave modules each including a second CPU, a second control circuit, and at least one third switch with the third switch coupled between the second control circuit and the second switch, and the second CPU coupled to the third switch and the second control circuit respectively, so that the second CPU of each slave module is operative to receive or send packets or signals through the second control circuit, and to open or close the third switch; wherein when the master module detects that a network monitoring device is coupled to the user I/O interface for performing a network monitoring and management, a system configuration, or a debugging with respect to one of the slave modules, the first CPUs are operative to connect or disconnect the switches for transferring an access right of the user I/O interface from the master module to one of the slave modules and enabling the module to receive signals sent from the user I/O interface. By utilizing this intelligent apparatus, it is possible of sharing a single user I/O interface among all of the intelligent master and slave modules.

In one aspect of the present invention the intelligent apparatus first utilizes software to determine a target of user I/O interface connected thereto. Then hardware of the intelligent apparatus issues a command to control an ON or OFF of a switch associated with one of the modules. In response, the said module receives the command also gaining an access right to the user I/O interface. As an end, a network management person may not be confused in a visual identification of the corresponding user I/O interface of one of the modules while performing network monitoring and management, system configuration and debugging, and software updating with respect to the specific module therein.

In another aspect of the present invention the intelligent apparatus enables a sharing of a single user I/O interface among all the modules provided on a single stack by transferring an access right of the user I/O interface to one of the modules. As a result, the number of user I/O interfaces provided on the intelligent apparatus is significantly reduced, the circuitry of each module is simplified, and the design and manufacturing costs of the intelligent apparatus are greatly reduced.

The above and other objects, features and advantages of the present invention will become apparent from the following detailed description taken with the accompanying drawings.

DETAILED DESCRIPTION OF THE PREFERRED EMBODIMENTS

Figure 1:
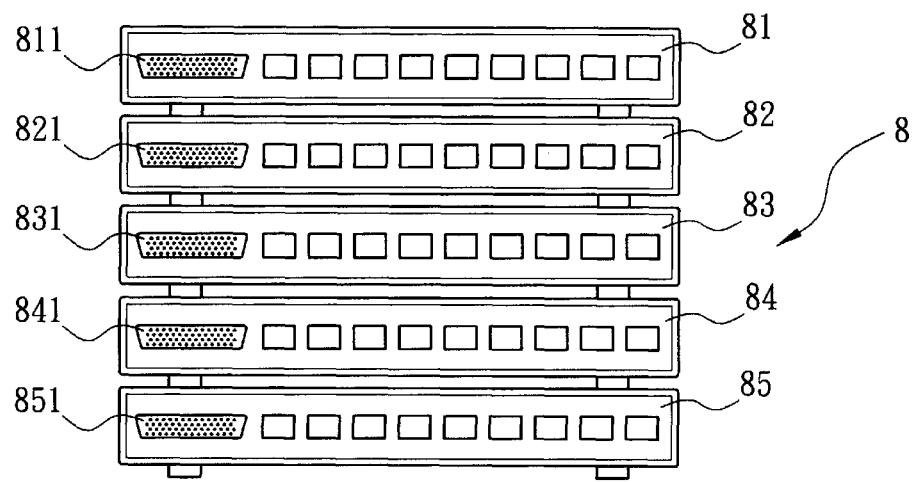
FIG. 1 is a side plan view of a conventional intelligent network switch apparatus.
Figure 2:
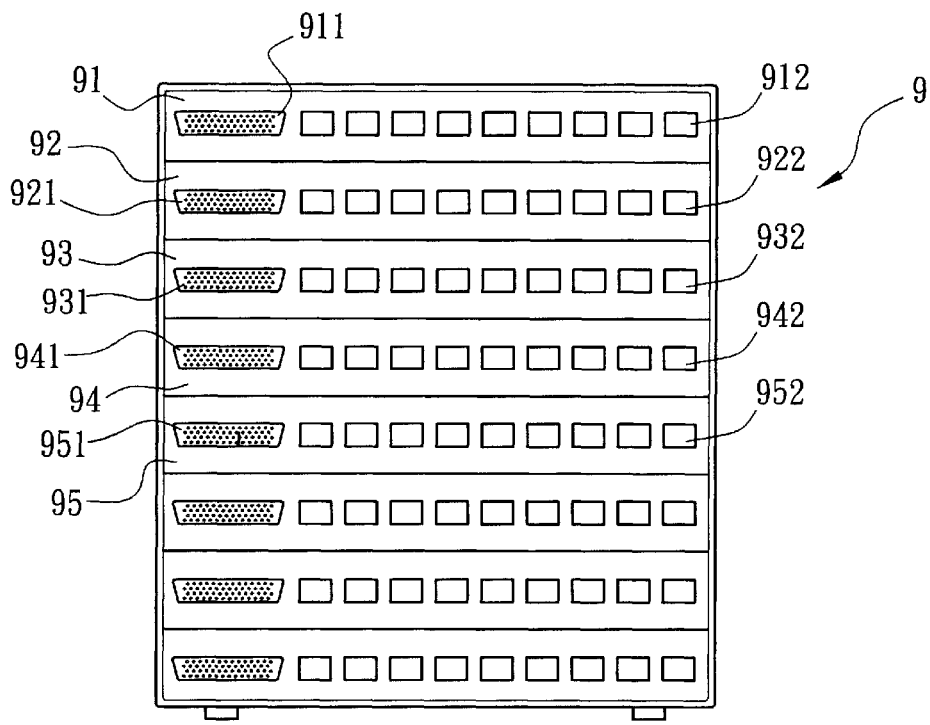
FIG. 2 is a side plan view of another conventional intelligent network switch apparatus.
Figure 3:
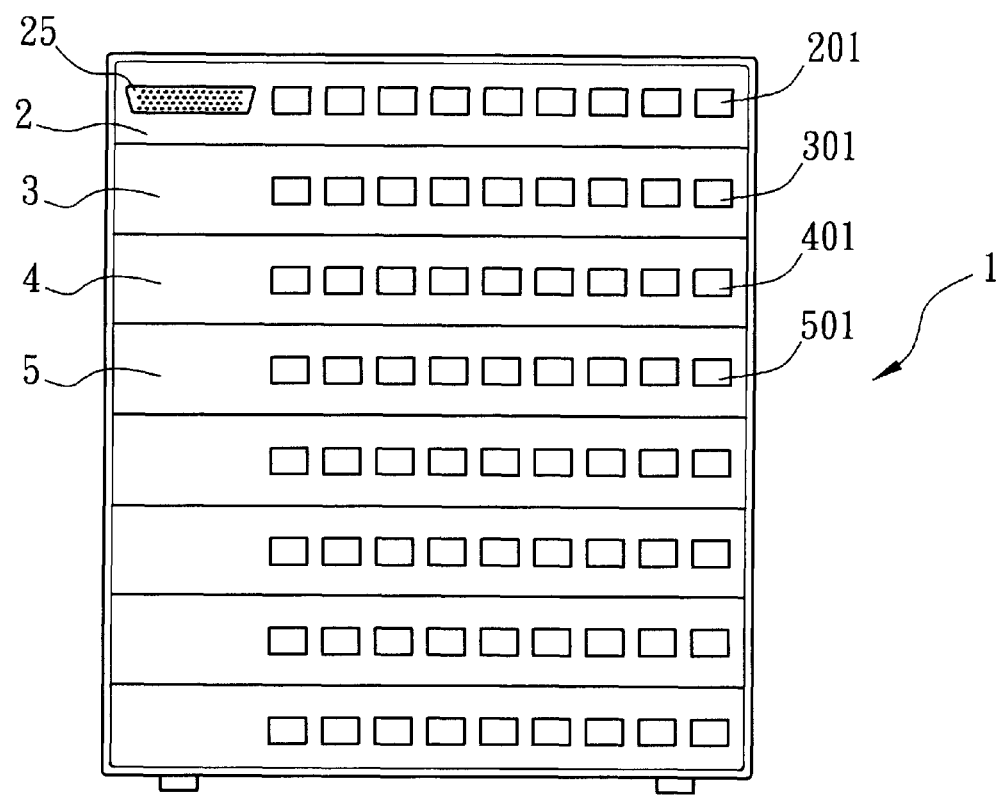
FIG. 3 is a side plan view of a preferred embodiment of intelligent apparatus according to the invention.
Figure 4:
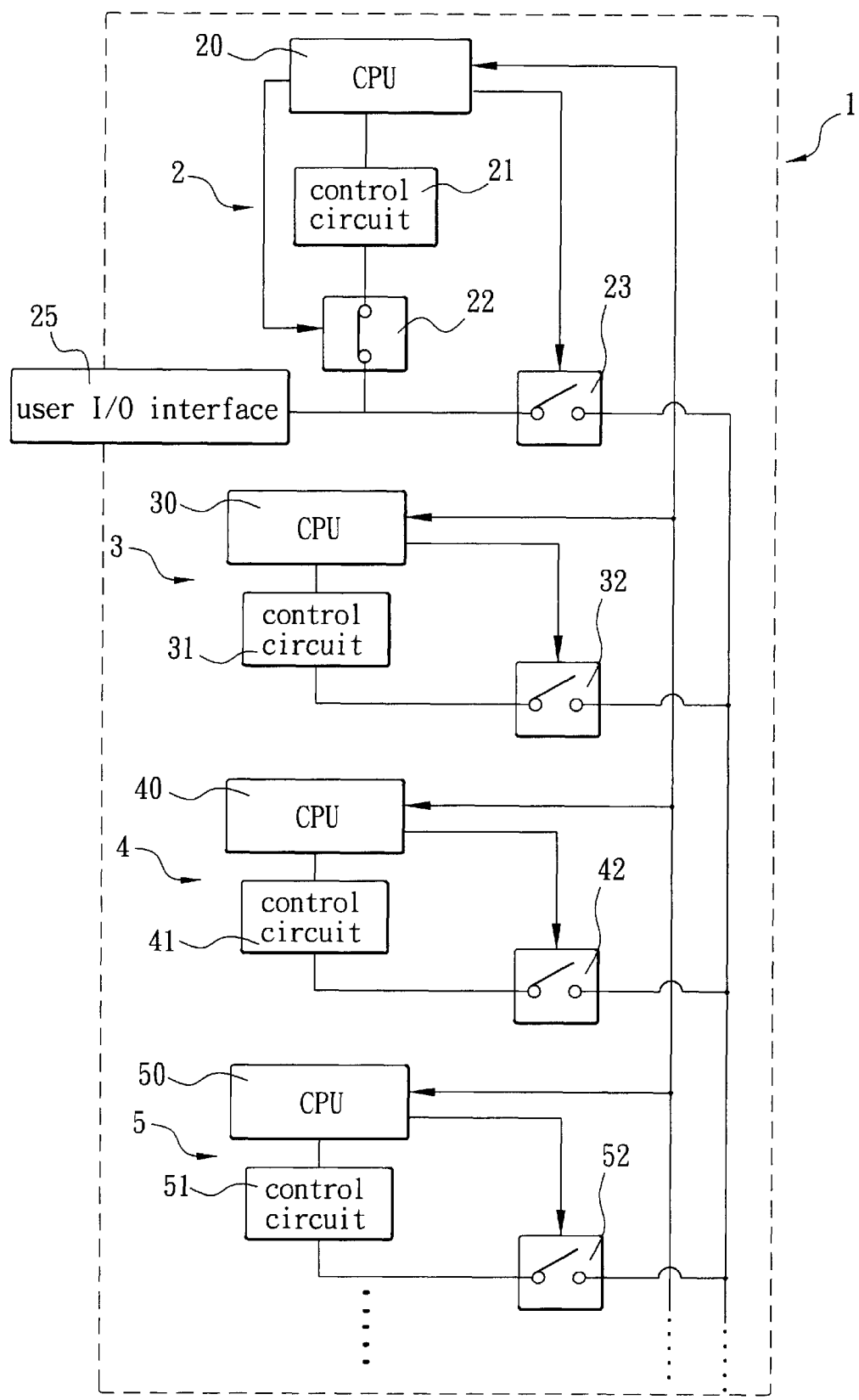
FIG. 4 is a schematic circuit block diagram showing an initial state of the apparatus shown in FIG. 3.

Referring to FIGS. 3 and 4, there is shown a preferred embodiment of intelligent apparatus 1 in accordance with the invention. The intelligent apparatus 1 is enclosed in a housing. The intelligent apparatus 1 comprises a master module 2 and a plurality of slave modules (e.g., 3, 4, and 5). Each of the master module 2 and slave modules 3, 4, and 5 comprises a circuit board. Each circuit board comprises a CPU 20, 30, 40, or 50 and a control circuit 21, 31, 41, or 51. Further, associated software is installed in each of the master and slave modules. Each of the slave modules 3, 4 and 5 has an associated port 301, 401, or 501 in communication with I/O port 201 of the master module 2. Hence, the CPU 20 of the master module 2 may control the CPUs 30, 40 and 50 of the slave modules 3, 4 and 5 respectively. This forms a single system. Also, other remaining I/O ports of the slave modules are in information communication with other associated network devices by interconnection.

In a preferred embodiment of the invention, the intelligent apparatus 1 is an intelligent network switch. Further, control circuits 21, 31, 41, and 51 and installed software are network control circuits and network software respectively. Note that the above is only a preferred embodiment of the invention it is not desired to limit the invention to the exact construction shown. Further, it is appreciated by those skilled in the art that various changes, substitutions and alternations can be made therein without departing from the scope and spirit of the invention.

In the preferred embodiment, there is provided only a single user I/O interface (e.g., RS-232) 25 in the intelligent apparatus 1. The user I/O interface 25 is provided on circuit board of the master module 2. Also, the CPU 20, 30, 40, or 50 of the module 2, 3, 4, or 5 is coupled to the control circuit 21, 31, 41, or 51 respectively. The module 2, 3, 4, or 5 further comprises the switch 22, 32, 42, or 52 for connecting the control circuit 21, 31, 41, or 51 to the user I/O interface 25. The master module 2 further comprises a second switch 23 for connecting the slave module 3, 4, or 5 to user I/O interface 25 respectively.

In the preferred embodiment, the switch 22, 32, 42, 52, or 23 is implemented as a relay. While it is appreciated by those skilled in the art that relay may be replaced by another suitable device in alternative embodiments without departing from the scope and spirit of the invention. The ON/OFF of the switch 22 or 23 of the master module 2 is controlled by the CPU 20. Likewise, the ON/OFF of the switch 32, 42, or 52 of the slave module 3, 4, or 5 is controlled by the CPU 30, 40, or 50 thereof respectively. When the master module 2 detects that a monitoring device is performing network monitoring and management, system configuration, or debugging, the CPU 20 of the master module 2 may transfer an access right of the user I/O interface 25 to each of the slave modules by closing or opening the switches 22 and 23. Further, one slave module may receive the access signal from the user I/O interface 25 by closing a switch thereof. Thereafter, one slave module may send a response to the user I/O interface 25 via the same transmission route. As a result, the monitoring device is capable of performing network monitoring and management, system configuration, or debugging with respect to the specific module.

Figure 5:
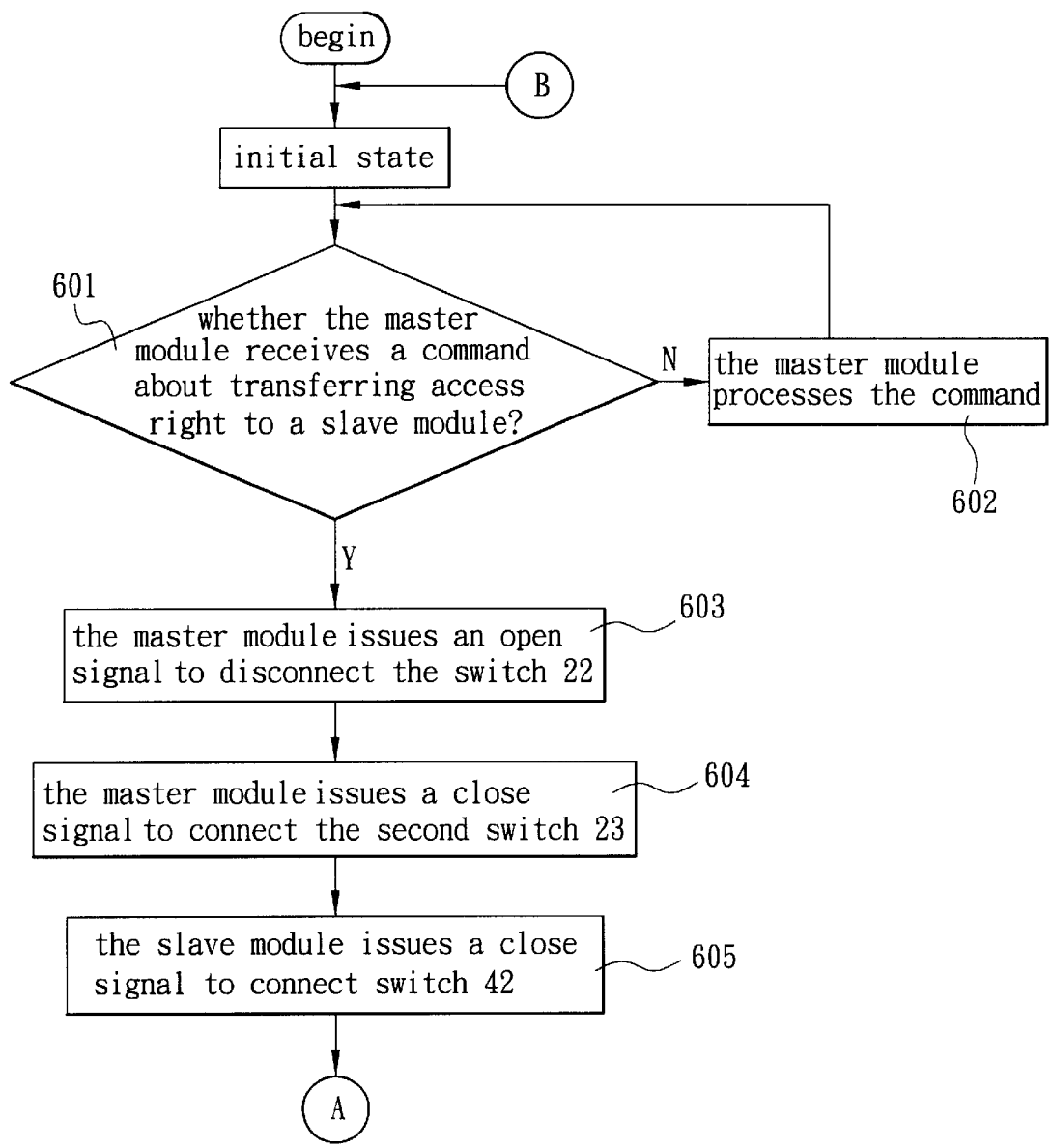
FIG. 5 is a flow chart illustrating a process performed by the apparatus shown in FIG. 3.
Figure 6:
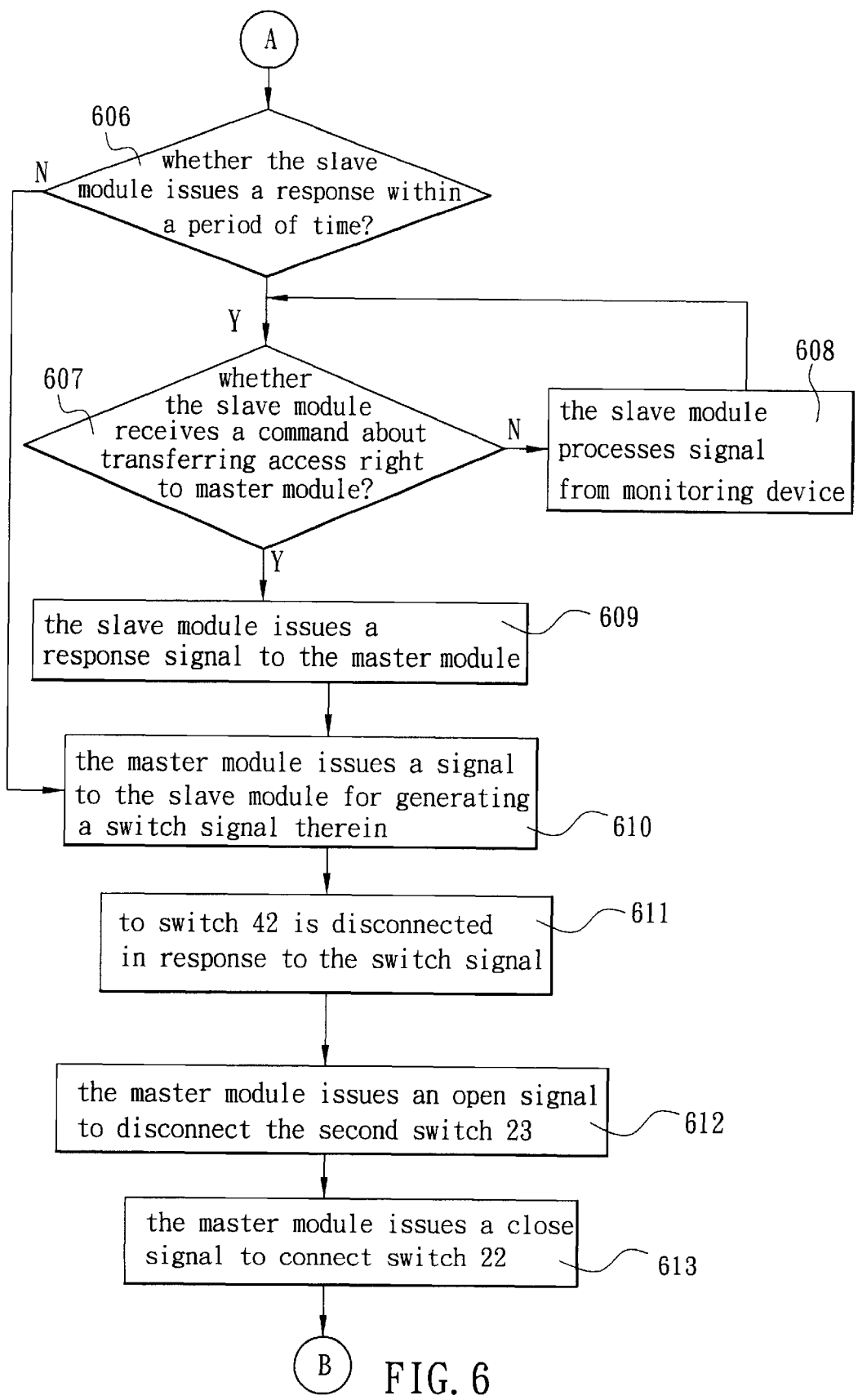
FIG. 6 is a flow chart illustrating another process as a continuation of that of FIG. 5.

In a case that a network management person desires to perform network monitoring and management, system configuration, or debugging with respect to a specific slave module (e.g., slave module labeled 4), the network management person may couple a network monitoring device to the user I/O interface 25 projected from the housing of the intelligent apparatus 1. Next, the network management person may issue a command to the master module 2 through the user I/O interface 25. As understood that the access right of the user I/O interface 25 belongs to the master module 2 in an initial state. Hence, the switch 22 of the master module 2 is ON (i.e., closed) while the second switch 23 thereof is OFF (i.e., open). Referring to FIGS. 5 and 6, an operation of components of the intelligent apparatus 1 is detailed below.

In step 601, once the CPU 20 of the master module 2 receives a command from the network monitoring device through the control circuit 21, the CPU 20 will determine whether the command requires to transfer an access right of the user I/O interface 25 to one of the slave modules. If not, the process goes to step 602. Otherwise, the process jumps to step 603.

In step 602, the CPU 20 of the master module 2 processes the command directly prior to looping back to step 601.

In step 603, the CPU 20 of the master module 2 issues an open signal to the switch 22 to force it to become disconnected.

Figure 7:
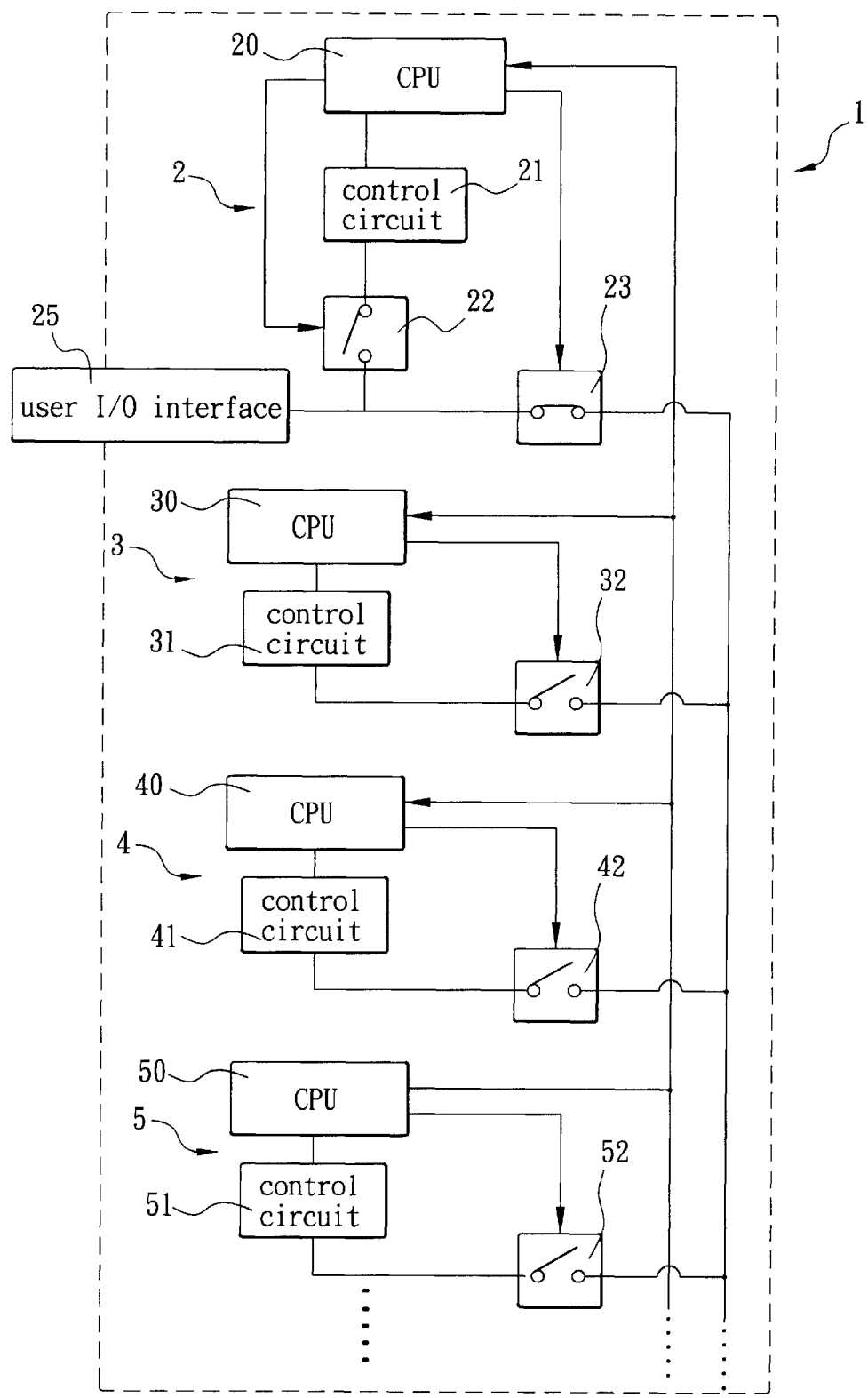
FIG. 7 is a schematic circuit block diagram of the apparatus shown in FIG. 3 showing a state where control is transferring.

In step 604, the CPU 20 of the master module 2 issues a close signal to the second switch 23 to force it to become connected. As a result, the slave module 3, 4, or 5 is coupled to the user I/O interface 25 to gain the access right of the user I/O interface 25. At this time, the connection states of components of the intelligent apparatus 1 are illustrated in FIG. 7.

Figure 8:
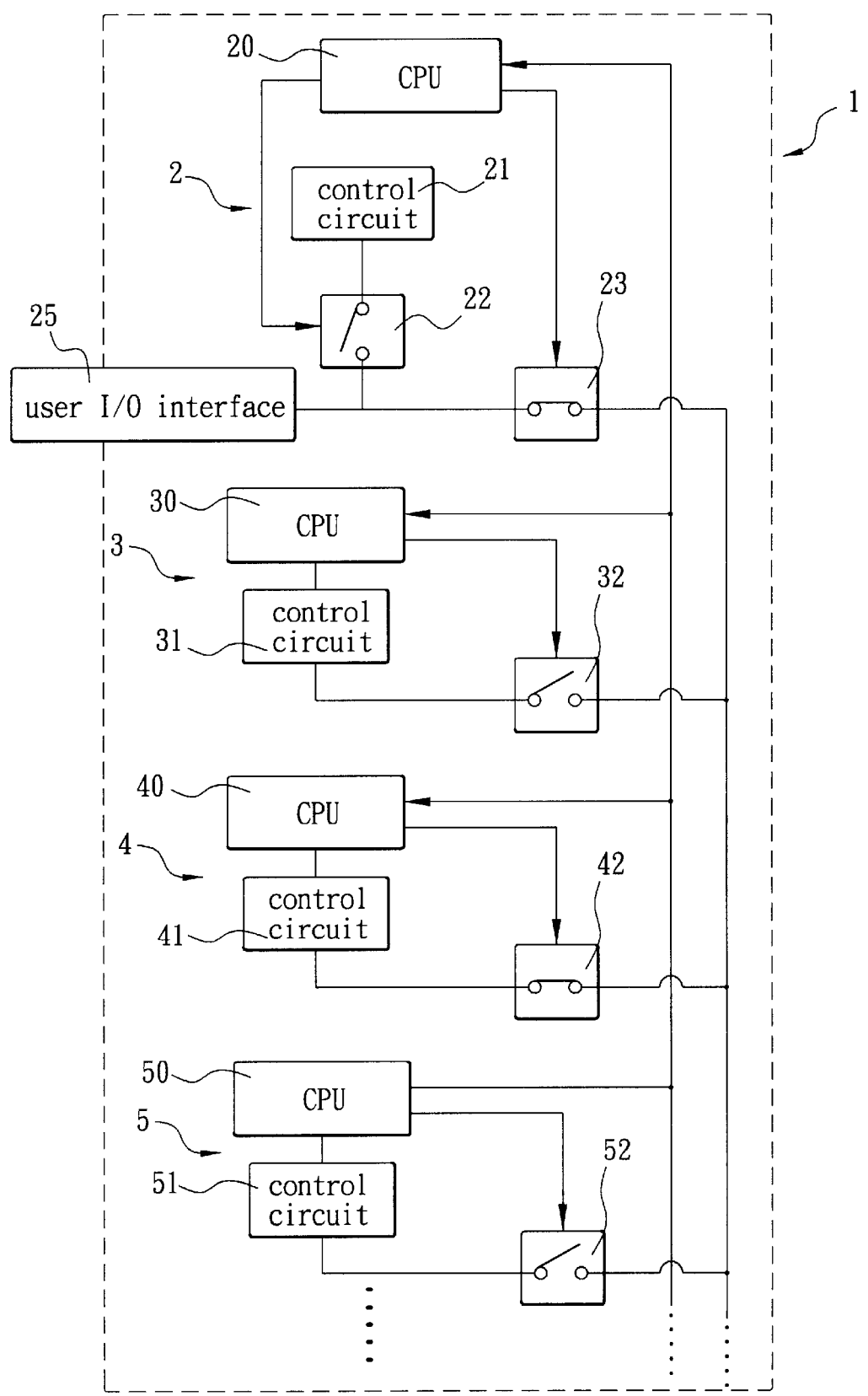
FIG. 8 is a view similar to FIG. 7 showing a state where control has been transferred.

In step 605, the CPU 20 of the master module 2 issues a signal to the slave module 3, 4, or 5 for informing it as a target to be monitored and managed, system configured, or debugged. For example, the slave module 4 is the target to be monitored and managed, system configured, or debugged by the network monitoring device. In response, the slave module 4 issues a close signal to the switch 42 to force it to become connected to the user I/O interface 25. At this time, the connection states of components of the intelligent apparatus 1 are illustrated in FIG. 8, wherein the slave module 4 gains the access right of the user I/O interface 25 and the switches 32 and 52 of other slave modules 3 and 5 are OFF.

In step 606, the CPU 20 of the master module 2 determines whether the slave module 4 issues a response within a predetermined period of time. If yes, the process goes to step 607. Otherwise, the process jumps to step 610.

In step 607, the CPU 40 of the slave module 4 determines whether it has received a command requiring to transfer an access right of the user I/O interface 25 to the master module 2. If not, the process goes to step 608. Otherwise, the process jumps to step 609.

In step 608, the CPU 40 of the slave module 4 processes signal received from the network monitoring device prior to looping back to step 607.

In step 609, the CPU 40 of the slave module 4 issues a response signal to the master module 2.

In step 610, the CPU 20 of the master module 2 issues a signal to the slave module 4 for causing the slave module 4 to generate a switch signal. The switch signal is then sent to the switch 42.

In step 611, the switch 42 is forced to become disconnected in response to the switch signal (see FIG. 4).

In step 612, the CPU 20 of the master module 2 issues an open signal to the second switch 23 to force it to become disconnected.

In step 613, the CPU 20 of the master module 2 issues a close signal to the switch 22 to force it to become connected. As a result, the master module 2 is coupled to the user I/O interface 25 to gain the access right of the user I/O interface 25 again. At this time, the connection states of components of the intelligent apparatus 1 are illustrated in FIG. 4 the same as the initial state of the intelligent apparatus 1.

Figure 9:
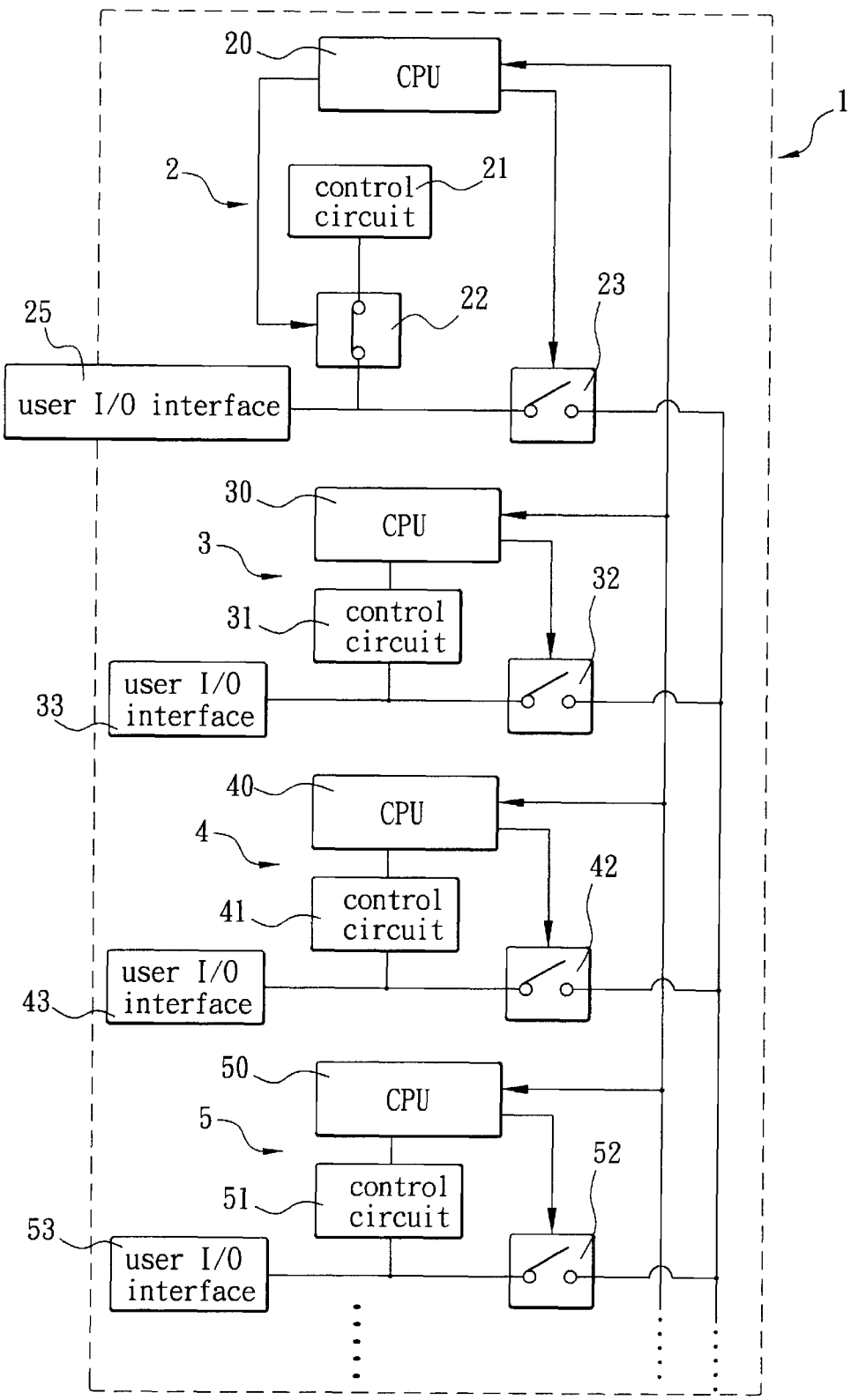
FIG. 9 is a schematic circuit block diagram showing another preferred embodiment of intelligent apparatus according to the invention.

Referring to FIG. 9, there is shown a schematic circuit block diagram showing another preferred embodiment of the intelligent apparatus according to the invention. The preferred embodiment is designed to customize the slave modules 3, 4, and 5 as independent devices in performing network monitoring and management, system configuration, or debugging. As shown, the user I/O interfaces 33, 43, and 53 are additionally provided to interconnect the control circuits 31, 41, and 51 and the switches 32, 42, and 52 respectively. Note that in the another preferred embodiment, the user I/O interfaces 33, 43, and 53 are enclosed in the same housing which harbors the slave modules 3, 4, and 5 of the intelligent apparatus 1.

In brief, the intelligent apparatus of the invention first utilizes software to determine a target of user I/O interface connected thereto. Then hardware of the intelligent apparatus issues a command to control an ON or OFF of a switch associated with one of slave modules. In response, one slave module receives the command also gaining an access right to the user I/O interface. As an end, network management person may not be confused in a visual identification of the corresponding user I/O interface of module while performing network monitoring and management, system configuration and debugging, and software updating with respect to a certain module. Moreover, a sharing of a single user I/O interface among all master and slave modules of the intelligent apparatus is made possible by transferring an access right of the user I/O interface to one of the modules. As a result, the number of user I/O interfaces provided on the intelligent apparatus is significantly reduced, the circuitry of each module is simplified, and the design and manufacturing costs of the intelligent apparatus are greatly reduced.

While the invention has been described by means of specific embodiments, numerous modifications and variations could be made thereto by those skilled in the art without departing from the scope and spirit of the invention set fort

What is claimed is:

1. An intelligent apparatus comprising:

a master including a user input/output (I/O) interface, a first central processing unit (CPU), a first control circuit and a plurality of switches including first and second switches with the first switch coupled between the first control circuit and the user I/O interface, the second switch coupled to the user I/O interface, and the first CPU coupled to the first switch, the second switch and the first control circuit respectively, so that the first CPU is operative to receive or send packets or signals through the first control circuit and open or close the first and the second switches; and a plurality of slave modules each including a second CPU, a second control circuit, and at least one third switch with the third switch coupled between the second control circuit and the second switch, and the second CPU coupled to the third switch and the second control circuit respectively, so that the second CPU of each slave module is operative to receive or send packets or signals through the second control circuit and open or close the third switch;

wherein when the master detects that a network monitoring device is coupled to the user I/O interface for performing a network monitoring and management, a system configuration, or a debugging with respect to one of the modules, the CPUs are operative to connect or disconnect the switches for transferring an access right of the user I/O interface to the one of the modules and enabling the one of the modules to receive signals sent from the user I/O interface, thereby sharing the user I/O interface among the plurality of modules.

2. The intelligent apparatus of claim 1, wherein each of the master and the slave modules comprises a circuit board including the associated CPU, the associated control circuit, an associated software, a communication port, and a plurality of I/O ports with the communication port of each of the slave modules in communication with the communication port of the master so that the first CPU is operative to control the second CPUs of the slave modules respectively, thereby forming a single system and the other remaining I/O ports of the slave modules are in information communication with other associated network devices by interconnection.

3. The intelligent apparatus of claim 1, wherein each of the switches is a relay.

4. The intelligent apparatus of claim 1, further comprising a housing for harboring the master and the slave modules.

5. The intelligent apparatus of claim 4, wherein the user I/O interface is projected from the housing.

6. The intelligent apparatus of claim 4, further comprising a second user I/O interface on each of the first and the second control circuits for interconnecting the associated control circuit and the associated switch so that the second user I/O interfaces are enclosed in the housing which harbors the slave modules.

* * * * *